US012616094B2

(12) United States Patent　　(10) Patent No.: US 12,616,094 B2
Trowbridge　　(45) Date of Patent: May 5, 2026

(54) GAUGE WHEEL CONTROL SYSTEM FOR AN AGRICULTURAL SYSTEM

(71) Applicant: CNH Industrial America LLC, New Holland, PA (US)

(72) Inventor: Jeffrey C. Trowbridge, Stevens, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 637 days.

(21) Appl. No.: 18/013,847

(22) PCT Filed: Jun. 30, 2021

(86) PCT No.: PCT/US2021/039906
§ 371 (c)(1),
(2) Date: Dec. 29, 2022

(87) PCT Pub. No.: WO2022/006280
PCT Pub. Date: Jan. 6, 2022

(65) Prior Publication Data
US 2023/0284561 A1　Sep. 14, 2023

Related U.S. Application Data

(60) Provisional application No. 63/046,198, filed on Jun. 30, 2020.

(51) Int. Cl.
*A01D 41/14*　　(2006.01)
(52) U.S. Cl.
CPC ......... *A01D 41/141* (2013.01); *A01D 41/145* (2013.01)

(58) Field of Classification Search
CPC .... A01D 41/141; A01D 41/145; A01D 41/06; A01D 41/14
(Continued)

(56) References Cited

U.S. PATENT DOCUMENTS 3,603,066 A * 9/1971 Burrough ............. A01D 34/246
56/208
5,297,378 A 3/1994 Smith
(Continued)

FOREIGN PATENT DOCUMENTS

EP　1269825 A1　1/2003
EP　2156725 A2　2/2010
(Continued)

OTHER PUBLICATIONS

PCT International Search Report and Written Opinion; Application No. PCT/US2021/039906; dated Oct. 21, 2021; 12 pages.

*Primary Examiner* — Joseph M Rocca
*Assistant Examiner* — Sunny D Webb
(74) *Attorney, Agent, or Firm* — Fletcher Yoder, P.C.

(57) ABSTRACT

An agricultural system includes a header comprising a gauge wheel and a frame, in which the gauge wheel and the frame are coupled to a hydraulic cylinder that is configured to adjust the gauge wheel relative to the frame. The agricultural system also includes a hydraulic circuit fluidly coupled to the hydraulic cylinder, in which the hydraulic circuit is configured to control a fluid flow into and out of the hydraulic cylinder to adjust the gauge wheel relative to the frame, and the hydraulic circuit includes an accumulator configured to enable an amount of fluid in the hydraulic cylinder to change during a harvesting operation of the agricultural system such that the gauge wheel may oscillate from a set position during the harvesting operation.

17 Claims, 7 Drawing Sheets

(58) Field of Classification Search
USPC ............... 56/10.2 E, 208; 137/596.14; 73/37
See application file for complete search history.

(56) References Cited

U.S. PATENT DOCUMENTS

| | | | |
|---|---|---|---|
| 5,791,128 A * | 8/1998 | Rogalsky | A01D 41/142 |
| | | | 60/484 |
| 6,789,379 B2 | 9/2004 | Heidjann et al. | |
| 7,661,251 B1 * | 2/2010 | Sloan | A01D 41/145 |
| | | | 60/413 |
| 7,971,420 B1 * | 7/2011 | Bollin | A01D 41/145 |
| | | | 56/208 |
| 8,001,751 B2 * | 8/2011 | Ehrhart | A01B 63/1013 |
| | | | 56/11.9 |
| 8,079,204 B2 * | 12/2011 | Coers | A01D 41/14 |
| | | | 56/15.8 |
| 9,357,691 B2 | 6/2016 | Brockmann | |
| 9,717,180 B2 | 8/2017 | Teach et al. | |
| 10,455,764 B2 * | 10/2019 | Noll | A01D 41/145 |
| 11,297,765 B2 * | 4/2022 | Yanke | A01B 73/005 |
| 11,399,464 B2 * | 8/2022 | Kraus | F15B 13/04 |
| 11,497,165 B2 * | 11/2022 | Ricketts | A01D 61/008 |
| 12,376,522 B2 * | 8/2025 | Hunt | A01D 41/141 |
| 2011/0283673 A1 | 11/2011 | Moersch et al. | |
| 2014/0364179 A1 | 12/2014 | Brinkmann et al. | |
| 2017/0359955 A1 * | 12/2017 | Dunn | F15B 11/08 |
| 2019/0200523 A1 | 7/2019 | Fay, II et al. | |

FOREIGN PATENT DOCUMENTS

| | | | | | |
|---|---|---|---|---|---|
| EP | 2387870 A1 | | 11/2011 | | |
| EP | 2832206 A1 | | 2/2015 | | |
| EP | 2868185 A1 * | | 5/2015 | | A01D 75/00 |
| EP | 4393292 B1 * | | 10/2025 | | F15B 19/00 |

* cited by examiner

GAUGE WHEEL CONTROL SYSTEM FOR AN AGRICULTURAL SYSTEM

CROSS-REFERENCE TO RELATED APPLICATIONS

This application is a U.S. National Stage Application of PCT International Application No. PCT/US2021/039906, entitled "GAUGE WHEEL CONTROL SYSTEM FOR AN AGRICULTURAL SYSTEM," filed Jun. 30, 2021, which claims priority to and the benefit of U.S. Provisional Application No. 63/046,198, entitled "GAUGE WHEEL CONTROL SYSTEM FOR AN AGRICULTURAL SYSTEM," filed Jun. 30, 2020, each of which is hereby incorporated by reference in its entirety for all purposes.

BACKGROUND

The disclosure relates generally to a header for an agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester. Certain headers include a cutter bar assembly configured to cut a portion of each crop (e.g., a stalk), thereby separating the cut crop from the soil. The cutter bar assembly may extend along a substantial portion of a width of the header at a forward end of the header. The header may also include one or more belts positioned behind the cutter bar assembly relative to the direction of travel of the harvester. The belt(s) are configured to transport the cut crops to an inlet of the processing system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In some embodiments, an agricultural system includes a header comprising a gauge wheel and a frame, in which the gauge wheel and the frame are coupled to a hydraulic cylinder that is configured to adjust the gauge wheel relative to the frame. The agricultural system also includes a hydraulic circuit fluidly coupled to the hydraulic cylinder, in which the hydraulic circuit is configured to control a fluid flow into and out of the hydraulic cylinder to adjust the gauge wheel relative to the frame, and the hydraulic circuit includes an accumulator configured to enable an amount of fluid in the hydraulic cylinder to change during a harvesting operation of the agricultural system such that the gauge wheel may oscillate from a set position during the harvesting operation.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
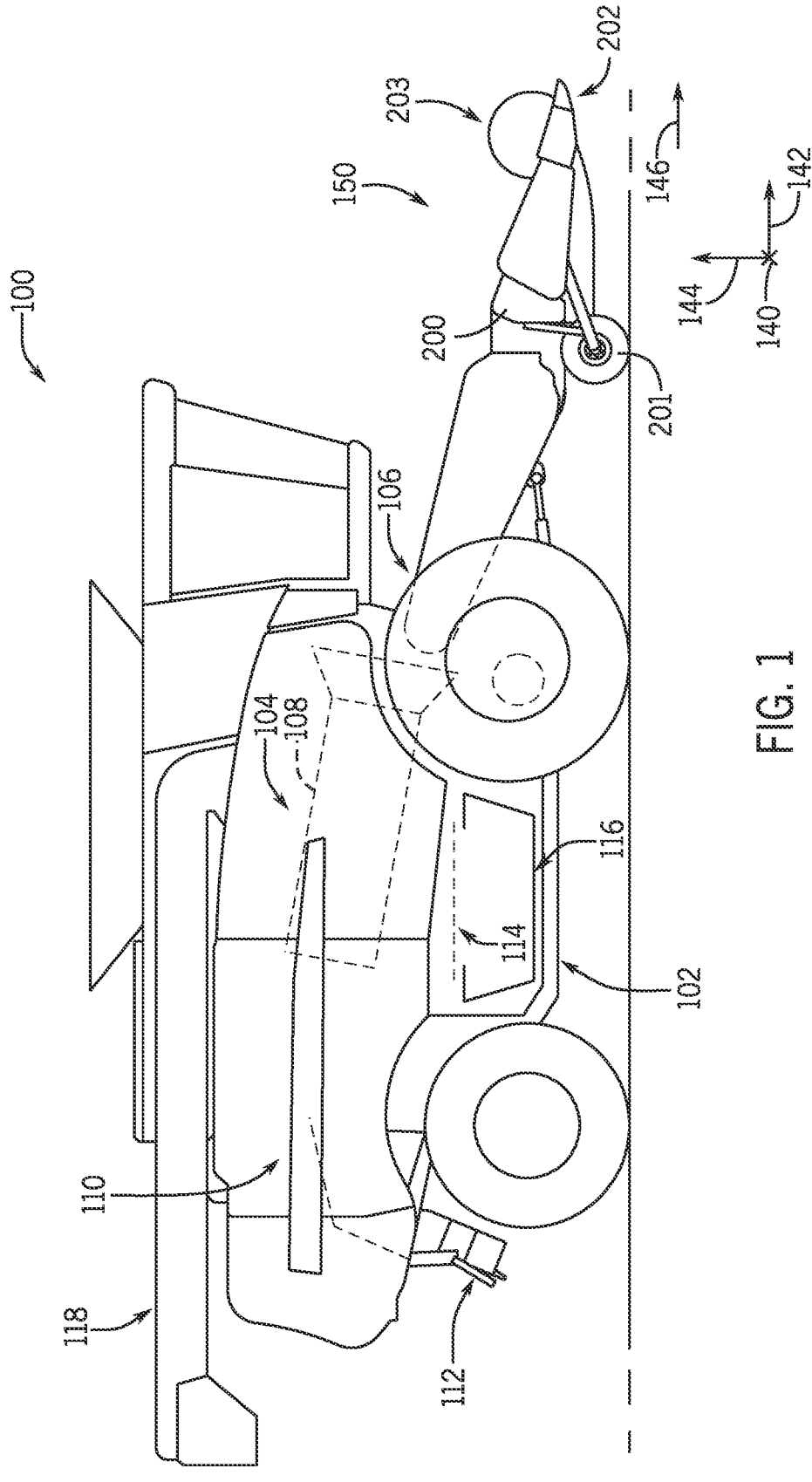
FIG. 1 is a side view of an embodiment of an agricultural system, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The process of farming typically begins with planting seeds within a field. Over time, the seeds grow and eventually become harvestable crops. Typically, only a portion of each crop is commercially valuable, so each crop is harvested to separate the usable material from a remainder of the crop. For example, a harvester may cut crops within a field via a header, which may include a flexible draper header. The flexible draper header may include a cutter bar assembly configured to cut the crops. As the cutter bar assembly cuts the crops, a conveyor coupled to draper deck(s) of the header moves the cut crops toward a crop processing system of the harvester. For example, the conveyor on the side draper deck(s) may move the cut crops toward an infeed draper deck at a center of the header. A conveyor on the infeed draper deck may then move the cut crops toward the crop processing system. The crop processing system may include a threshing machine configured to thresh the cut crops, thereby separating the cut crops into certain desired agricultural materials, such as grain, and material other than grain (MOG). The desired agricultural materials may be sifted and then accumulated into a tank. When the tank fills to capacity, the desired agricultural materials may be collected from the tank. The MOG may be discarded from the harvester (e.g., via a spreader) by passing through an exit pipe or a spreader to fall down onto the field.

The header may include gauge wheels that may be used to adjust a position of the header. For example, the gauge wheels may be used to adjust a position of the header (e.g., a cutter bar assembly of the header) relative to the field. Thus, the gauge wheels may adjust a height at which the header may cut crops, such as based on the particular crop harvested by the agricultural system. Unfortunately, it may be difficult in certain agricultural systems to adjust the gauge wheels. For instance, a user (e.g., an operator) may have to suspend operation of the agricultural system in order to manually adjust the gauge wheels, thereby reducing an efficiency of the operation of the agricultural system. Furthermore, it may be difficult to maintain the position of the gauge wheels, such as during a harvest mode, to block unwanted movement of the gauge wheels.

Thus, it is now recognized that a system that enables the gauge wheels to be automatically adjusted may improve the efficiency of the operation of the agricultural system. Accordingly, embodiments of the present disclosure are directed to a system and method for hydraulically controlling the position of the gauge wheels in order to adjust the position of the header. For example, a hydraulic circuit may enable fluid transfer between a fluid reservoir and hydraulic cylinders of the gauge wheels to adjust the position of the gauge wheels. The hydraulic circuit may also block fluid transfer between the fluid reservoir and the hydraulic cylinders to substantially maintain the position of the gauge wheels. For instance, the hydraulic circuit may include valves that may be positioned to fluidly isolate the hydraulic cylinders from a remainder of the hydraulic circuit. In certain embodiments, the hydraulic circuit includes an accumulator that may receive fluid from and/or supply fluid to the hydraulic cylinders while fluid transfer is blocked between the fluid reservoir and the hydraulic cylinders. Thus, the accumulator may enable some movement of the gauge wheels from a set position, such as to enable oscillatory or spring-like motion of the gauge wheels to accommodate and follow contours of the field, while fluid transfer is blocked between the fluid reservoir and the hydraulic cylinders. As such, the accumulator may improve navigation of the header along the field to improve the harvesting operation of the header.

With the foregoing in mind, FIG. 1 is a side view of an embodiment of an agricultural system 100, which may be a harvester (e.g., agricultural harvester). The agricultural system 100 includes a chassis 102 configured to support a header 150 (e.g., agricultural header) and an agricultural crop processing system 104. As described in greater detail below, the header 150 is configured to cut crops and to transport the cut crops toward an inlet 106 of the agricultural crop processing system 104 for further processing of the cut crops. The agricultural crop processing system 104 receives the cut crops from the header 150 and separates desired crop material from crop residue. For example, the agricultural crop processing system 104 may include a thresher 108 having a cylindrical threshing rotor that transports the crops in a helical flow path through the agricultural system 100. In addition to transporting the crops, the thresher 108 may separate certain desired crop material (e.g., grain) from the crop residue, such as husks and pods, and may enable the desired crop material to flow into a cleaning system 114 (such as sieves) located beneath the thresher 108. The cleaning system 114 may remove debris from the desired crop material and transport the desired crop material to a storage tank 116 within the agricultural system 100. When the storage tank 116 is full, a tractor with a trailer on the back may pull alongside the agricultural system 100. The desired crop material collected in the storage tank 116 may be carried up by an elevator and dumped out of an unloader 118 into the trailer. The crop residue may be transported from the thresher 108 to a crop residue handling system 110, which may process (e.g., chop/shred) and remove the crop residue from the agricultural system 100 via a crop residue spreading system 112 positioned at an aft end of the agricultural system 100. To facilitate discussion, the agricultural system 100 and/or its components may be described with reference to a lateral axis or direction 140, a longitudinal axis or direction 142, and a vertical axis or direction 144. The agricultural system 100 and/or its components may also be described with reference to a direction of travel 146.

As discussed in detail below, the header 150 includes a cutter bar assembly 202 configured to cut the crops within the field. The header 150 also includes a reel assembly 203 configured to engage the crops to prepare the crops to be cut by the cutter bar assembly 202 and/or to urge crops cut by the cutter bar assembly 202 onto a conveyor system that directs the cut crops toward the inlet 106 of the agricultural crop processing system 104. The reel assembly 203 includes a reel having multiple fingers extending from a central framework. The central framework is driven to rotate such that the fingers engage the crops and urge the crops toward the cutter bar assembly 202 and the conveyor system. Additionally, the reel may be supported by multiple arms (e.g., reel arms) that are coupled to a frame 200 of the header 150. Each of the arms may be coupled to the frame 200 via a respective pivot joint. For example, one pivot joint is configured to enable a first arm of the multiple arms to pivot (e.g., about the lateral axis 140) relative to the frame 200, and another pivot joint is configured to enable a second arm of the multiple arms to pivot (e.g., about the lateral axis 140) relative to the frame 200.

As illustrated, the header 150 includes gauge wheels 201 configured to support the frame 200 in certain operating conditions. During operation of the agricultural system, the gauge wheels 201 may be used to position the frame 200 relative to the field. For instance, the gauge wheels 201 may engage the field to maintain a desirable position of the frame 200 relative to the field. The gauge wheels 201 may also move relative to the frame 200 to adjust and set the position of the frame 200 relative to the field, such as to adjust a cutting height of the header 150.

Figure 2:
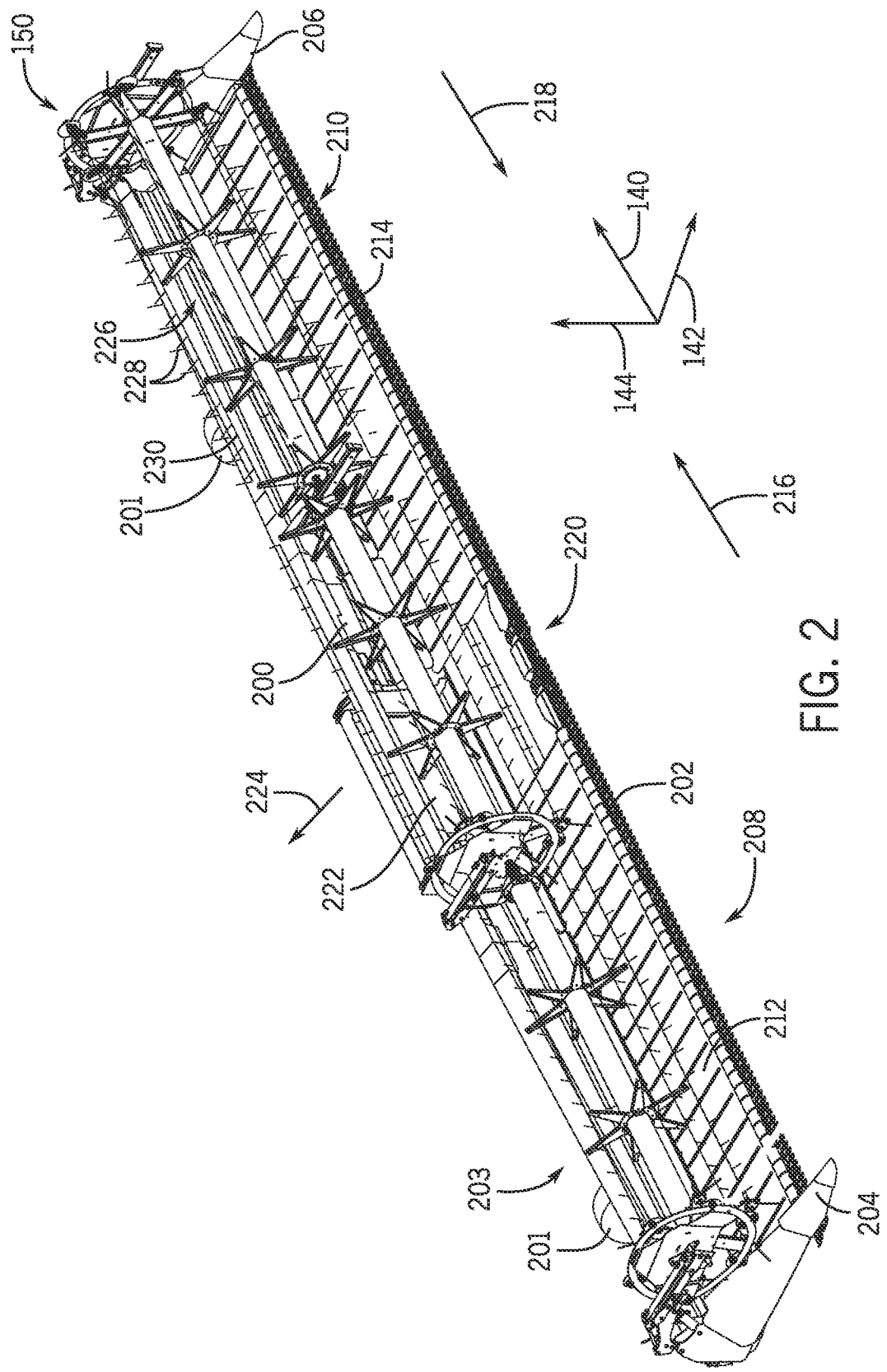
FIG. 2 is a perspective view of an embodiment of a header that may be employed within the agricultural system of FIG. 1, in accordance with an aspect of the present disclosure.

FIG. 2 is a top perspective view of an embodiment of the header 150 that may be employed within the harvester of FIG. 1. The header 150 includes a frame 200 that may be removably coupled to the harvester. The header 150 also includes a cutter bar assembly 202 that extends along the lateral axis 140 between a first header end 204 and a second header end 206 of the frame 200. When the agricultural system 100 is in operation, blades of the cutter bar assembly 202 may engage and cut a portion of crops. The cut portion of the crops may engage a first side draper deck 208, a second side draper deck 210, and an infeed draper deck 220 (e.g., a reel assembly may drive the cut crops toward the decks). The first side draper deck 208 includes a first side conveyor 212, and the second side draper deck 210 includes a second side conveyor 214. The first side conveyor 212 extends along the lateral axis 140 and moves crops generally in a first laterally inward direction 216. The second side conveyor 214 extends along the lateral axis 140 and moves crops generally in a second laterally inward direction 218. In certain embodiments, side decks (e.g., the first side draper deck 208 and the second side draper deck 210) and/or an infeed deck (e.g., the infeed draper deck 220) of the header 150 may include other configurations such that the conveyors are omitted. For example, the side decks and/or the infeed deck may include augers that may move the crops.

In certain embodiments, the first side draper deck 208 and the second side draper deck 210 include arm assemblies that extend through the first side conveyor and the second side conveyor, respectively. The arm assemblies may be coupled to the cutter bar assembly 202 at first ends and are coupled to biasing members (e.g., fluid-filled biasing members, such as airbags) at second ends. The arm assemblies may also be pivotably coupled to the frame 200 generally between the first ends and the second ends. The pivotal coupling between the arms and the frame 200 enables the cutter bar assembly 202 to flex during operation of the header 150. For example, the biasing members provide a downward force on the second ends of the arms that drives the first ends of the arms and the cutter bar assembly 202 upwardly. As such, the biasing members control the contact force between the cutter bar assembly 202 and the ground and enable the cutter bar assembly 202 to flex and to follow contours of the ground.

As shown, the infeed draper deck 220 is disposed between the first side draper deck 208 and the second side draper deck 210 along the lateral axis 140. As illustrated, the infeed draper deck 220 extends along the longitudinal axis 142. The infeed draper deck 220 includes an infeed conveyor 222. As each of the first side draper deck 208 and the second side draper deck 210 receive the cut portion of the crops, the first side conveyor 212 of the first side draper deck 208 and the second side conveyor 214 of the second side draper deck 210 move the cut portion of the crops toward the infeed draper deck 220 in the first laterally inward direction 216 and in the second laterally inward direction 218, respectively. The infeed draper deck 220 also receives the cut portion of the crops from the cutter bar assembly 202. The infeed conveyor 222 of the infeed draper deck 220 moves the cut portion of the crops in a longitudinally rearward direction 224 toward the crop processing system.

In certain embodiments, the infeed draper deck 220 includes an arm assembly and a panel assembly that are configured to pivot about a pivot axis. The panel assembly may be coupled to the cutter bar assembly 202 at a first end and pivotally coupled to the frame 200 at a second end. The arm assembly may also be coupled to the panel assembly and to the biasing members. As the arm assembly and the panel assembly pivot about the pivot axis, the biasing members are configured to control the contact force between the cutter bar assembly 202 and the ground. Thus, as the header 150 traverses the field, the cutter bar assembly 202 may flex. For example, when the cutter bar assembly 202 is positioned to contact the field surface (e.g., the ground), the cutter bar assembly 202 may flex to generally match a contour of the field surface. The ability of the cutter bar assembly 202 to flex enables the harvester to cut the crops in a desirable manner, thereby increasing crop yields while harvesting.

The header 150 includes the gauge wheels 201 that support the frame 200. The gauge wheels 201 may adjust the frame 200 relative to the field and to thereby adjust and set the position of the cutter bar assembly 202 relative to the field. By way of example, the gauge wheels 201 may be moved away from the frame 200 to raise the cutter bar assembly 202 away from the field, or the gauge wheels 201 may be moved toward the frame 200 to lower the cutter bar assembly 202 toward the field. For instance, the gauge wheels 201 may be used to enable the cutter bar assembly 202 to cut crops at a target height. During operation of the header 150 to cut crops, the gauge wheels 201 may also oscillate relative to the frame 200 in order to maintain the position of the cutter bar assembly 202 relative to the field. That is, the gauge wheels 201 may move relative to the frame 200 so as to follow the contour of the field and block unwanted movement of the cutter bar assembly 202. As a result, the gauge wheels 201 may enable the cutter bar assembly 202 to continuously cut crops at the target height.

In the illustrated embodiment, the crops cut by the cutter bar assembly 202 are directed to the side conveyors 212, 214 at least in part by the reel assembly 203, thereby substantially reducing the possibility of the cut crops falling onto the surface of the field. The reel assembly 203 includes a reel 226 having fingers or tines 228 extending from a central framework 230. The central framework 230 is driven to rotate such that the fingers 228 move (e.g., in a circular pattern). The fingers 228 are configured to engage the crops and urge the cut crops toward the side conveyors 212, 214 to facilitate transportation of the cut crops to the agricultural crop processing system.

Figure 3:
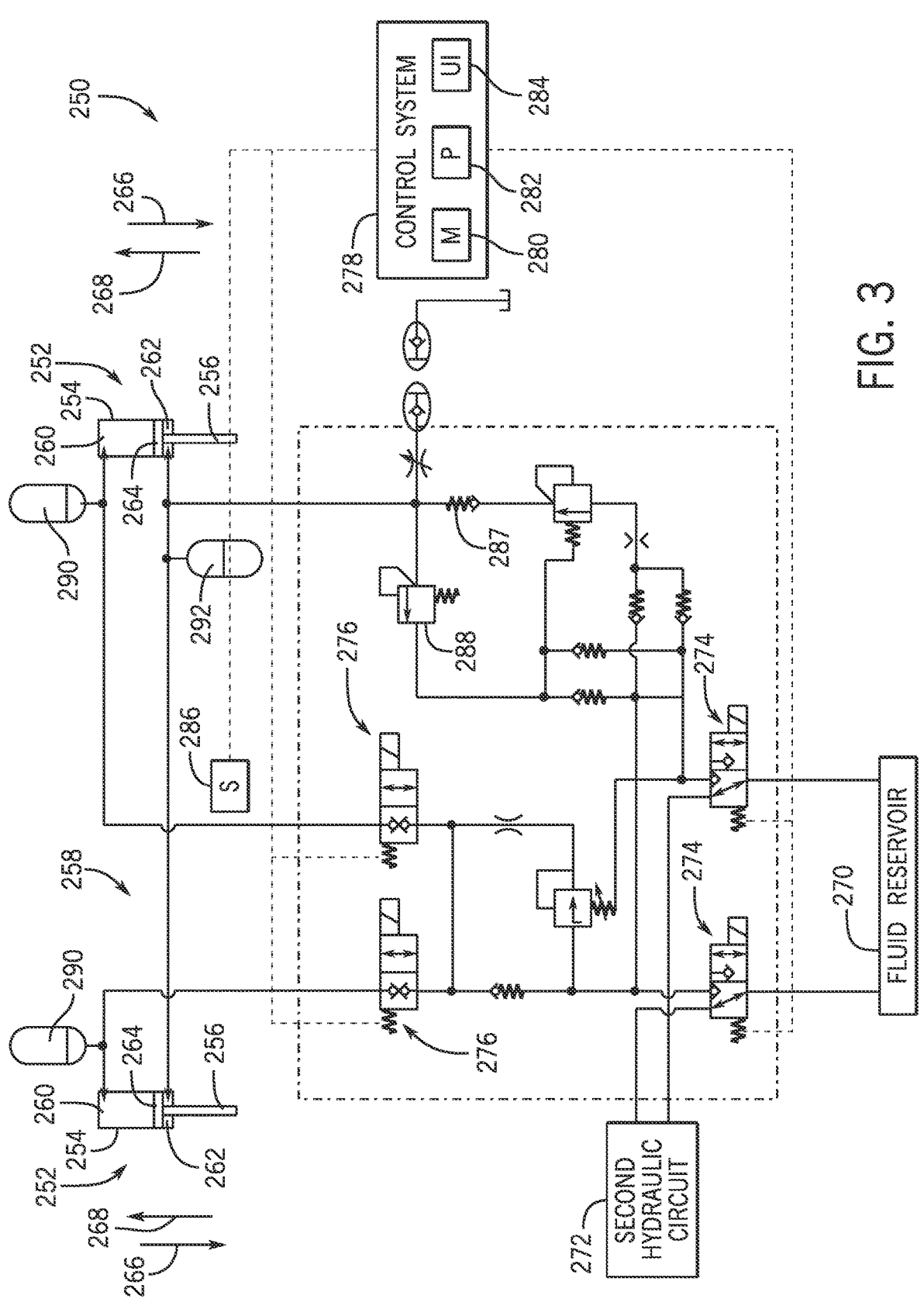
FIG. 3 is a schematic diagram of an embodiment of a hydraulic system that may be used to control a gauge wheel that may be employed within the header of FIG. 2, in accordance with an aspect of the present disclosure.

FIG. 3 is a schematic diagram of an embodiment of a hydraulic system 250 that may be used to control the gauge wheel of the header of FIG. 2. The hydraulic system 250 may include hydraulic cylinders 252 (e.g., hydraulic cylinder assemblies) that are each configured to be coupled to a respective gauge wheel. Each hydraulic cylinder 252 may include a body 254 and a rod 256 enclosed within the body 254. The body 254 may be supported on or fixed to (e.g., fixedly coupled to) the frame of the header, and the rod 256 may be coupled to the gauge wheel, such as via an arm and/or a linkage system. The rod 256 may be configured to move within the body 254 in order to move the gauge wheel (e.g., relative to the frame of the header). For instance, the rod 256 may be configured to move up to 15 centimeters (6 inches), up to 30 centimeters (12 inches), up to 50 centimeters (20 inches), or up to any suitable distance within the body 254.

In some embodiments, the hydraulic cylinders 252 may each be fluidly coupled to a first hydraulic circuit 258 that may direct fluid, such as oil or water, into and out of the hydraulic cylinders 252. For example, each body 254 may include a first section 260 and a second section 262 configured to hold a respective amount of fluid. A piston 264 coupled to the rod 256 may be sized and positioned within the body 254 so as to block fluid flow between the first section 260 and the second section 262 (e.g., via an annular seal that provides a seal between the piston 264 and an inner wall of the body 254). In this way, a pressure differential between the first section 260 and the second section 262 may drive the rod 256 to move within the body 254. As an example, increasing the pressure in the first section 260 to be greater than the pressure in second section 262 may drive the rod 256 to move in a first direction 266 within the body 254 (e.g., to move the gauge wheels away from the frame). Moreover, increasing the pressure in the second section 262 to be greater than the pressure in the first section 260 may drive the rod 256 to move in a second direction 268 within the body 254 opposite the first direction 266 (e.g., to move the gauge wheels toward the frame). In this way, fluid may be directed into and out of the hydraulic cylinders 252 to control the position of the gauge wheels. Although the illustrated embodiment includes two hydraulic cylinders 252, in additional or alternative embodiments, the hydraulic system may include any suitable number of hydraulic cylinders to control the gauge wheels of the header, such as an individual hydraulic cylinder to control a respective gauge wheel, an individual hydraulic cylinder to control multiple gauge wheels, and/or multiple hydraulic cylinders to control a single gauge wheel.

The illustrated hydraulic system 250 includes a fluid reservoir 270 that is fluidly coupled to the first hydraulic circuit 258. The fluid reservoir 270 may supply fluid into and/or receive fluid from the first hydraulic circuit 258, such as to control fluid flow within the hydraulic cylinders 252. As used herein, a fluid or a fluid flow may generally refer to fluid (e.g., hydraulic fluid) within any part of the hydraulic system 250. In certain embodiments, the hydraulic system 250 may also include a second hydraulic circuit 272 that may also be fluidly coupled to the fluid reservoir 270. The second hydraulic circuit 272 may be used to control another component of the header, such as a reel lift (e.g., of the reel assembly 203 of FIGS. 1 and 2) of the header, to facilitate operation of the header. For instance, the fluid reservoir 270 may supply fluid into and/or receive fluid from the second hydraulic circuit 272 to place the reel lift in a desirable position relative to the frame and/or the cutter bar assembly of the header to harvest crops. Thus, the same hydraulic system 250 may direct the fluid of the fluid reservoir 270 to control multiple components of the header.

In some embodiments, the hydraulic system 250 may be selectively controlled to enable fluid flow between the fluid reservoir 270 and one of the first hydraulic circuit 258 or the second hydraulic circuit 272. In other words, when fluid flow is enabled between the fluid reservoir 270 and one of the first hydraulic circuit 258 or the second hydraulic circuit 272, fluid flow is blocked between the fluid reservoir 270 and the other of the first hydraulic circuit 258 or the second hydraulic circuit 272. To this end, the hydraulic system 250 may include fluid reservoir valves 274 disposed along the first hydraulic circuit 258 and adjustable between a first position and a second position. In the first position, the fluid reservoir valves 274 may enable fluid flow between the fluid reservoir 270 and the first hydraulic circuit 258, while blocking fluid flow between the fluid reservoir 270 and the second hydraulic circuit 272. In the second position, the fluid reservoir valves 274 may enable fluid flow between the fluid reservoir 270 and the second hydraulic circuit 272, while blocking fluid flow between the fluid reservoir 270 and the first hydraulic circuit 258.

As shown, the hydraulic system 250 may include gauge wheel valves 276 configured to enable or block fluid flow between the fluid reservoir valves 274 and the hydraulic cylinders 252. For example, each gauge wheel valve 276 may be configured to adjust between a third position, which may enable fluid flow between the fluid reservoir valves 274 and the hydraulic cylinders 252 (e.g., the first section 260 of each hydraulic cylinder 252) to adjust the position of the hydraulic cylinders 252, and a fourth position, which may block fluid flow between the fluid reservoir valves 274 and the hydraulic cylinders 252 (e.g., the first section 260 of each hydraulic cylinder 252) to fluidly isolate the hydraulic cylinders 252 from a remainder of the hydraulic system 250. As such, the gauge wheel valves 276 may enable or block fluid flow between the fluid reservoir 270 and the hydraulic cylinders 252 to control the gauge wheels. The illustrated hydraulic system 250 includes two gauge wheel valves 276 configured to control fluid flow to a respective hydraulic cylinder 252, but additional or alternative hydraulic systems may include any suitable number of gauge wheel valves, such as one gauge wheel valve configured to control fluid flow to multiple hydraulic cylinders, or a different number of gauge wheel valves based on the number of gauge wheels controllable by the hydraulic system.

In some embodiments, the fluid reservoir valves 274 and/or the gauge wheel valves 276 may be adjustable via a control system 278 (e.g., an electronic controller, a cloud-computing system) of the hydraulic system 250. The control system 278 may include a memory 280 and processing circuitry 282. The memory 280 may include volatile memory, such as random access memory (RAM), and/or non-volatile memory, such as read-only memory (ROM), optical drives, hard disc drives, solid-state drives, or any other non-transitory computer-readable medium that includes instructions to operate the hydraulic system 250. The processing circuitry 282 may include one or more application specific integrated circuits (ASICs), one or more field programmable gate arrays (FPGAs), one or more general purpose processors, or any combination thereof, configured to execute the instructions stored in the memory 280 to control the hydraulic system 250. For instance, the control system 278 may output a control signal to adjust the position of the fluid reservoir valves 274 and/or of the gauge wheel valves 276. As an example, the fluid reservoir valves 274 and/or the gauge wheel valves 276 may each be solenoid valves. The control signal may energize the fluid reservoir valves 274 to transition the fluid reservoir valves 274 to the first position to enable fluid flow between the fluid reservoir 270 and the first hydraulic circuit 258, and/or may energize the gauge wheel valves 276 to transition the gauge wheel valves 276 to the fourth position to enable fluid flow between the fluid reservoir valves 274 and the hydraulic cylinders 252.

In certain embodiments, the control system 278 may be configured to output the control signal based on a user input. To this end, the control system 278 may include a user interface 284, such as a touchscreen, a button, a switch, a dial, a slider, a trackpad, or any combination thereof, with which a user (e.g., an operator) may interact to cause the control system 278 to output the control signal. That is, the control system 278 may control fluid flow through the hydraulic system 250 (e.g., into and/or out of the hydraulic cylinders 252) based on the user input. Additionally or alternatively, the control system 278 may automatically output the control signal. By way of example, the hydraulic system 250 may include a sensor 286 that is communicatively coupled to the control system 278. The sensor 286 may monitor a parameter of the agricultural system, such as an operating mode, a time of operation, a fluid pressure in the hydraulic system 250 (e.g., at a section of the first hydraulic circuit 258), a configuration (e.g., position) of another component of the agricultural system, a fluid flow within the first hydraulic circuit 258, another parameter, or any combination thereof. The sensor 286 may transmit sensor data indicative of the parameter to the control system 278, and the control system 278 may output the control signal based on the sensor data. It should be noted that any suitable number of sensors 286 may be provided and may transmit sensor data indicative of one or more parameters. In further embodiments, the control system 278 may control the particular positioning of the gauge wheels based on the sensor data. That is, for example, the control system 278 may control the position of the rod 256 in the body 254 based on the sensor data transmitted by the sensor 286, such as based on whether the sensor data indicates the gauge wheels are at a desirable position relative to the frame of the header. In further embodiments, the control system 278 may display data received from the sensor 286. For instance, the control system 278 may display the fluid pressure in the hydraulic system 250 as monitored by the sensor 286 to a user, such that the user is notified of the amount of fluid in the hydraulic system 250 (e.g., to determine whether maintenance is needed to adjust the amount of fluid flowing through the hydraulic system 250).

In the illustrated embodiment, the hydraulic system 250 is in a first configuration, which may be a holding configuration (e.g., for a normal harvest mode). During the first configuration, fluid flow between the fluid reservoir 270 and the hydraulic cylinders 252 is blocked. As such, the position of the hydraulic cylinders 252, and therefore of the gauge wheels, are substantially maintained at a target or set position. To achieve the first configuration, the control system 278 may instruct each gauge wheel valve 276 to transition to the fourth position such that fluid is blocked from flowing between the fluid reservoir valves 274 and the first section 260 of each hydraulic cylinder 252. Moreover, a first check valve 287 may block fluid flow from the second section 262 of each hydraulic cylinder 252 to the fluid reservoir valves 274, and a pressure relief valve 288 may be set to block fluid flow from the fluid reservoir valves 274 to the second sections 262. As an example, the position of the pressure relief valve 288 may be based on an amount of fluid pressure exerted onto the pressure relief valve 288 (e.g., caused by fluid flow out of the second sections 262). In the first configuration, the position of the rod 256 of each hydraulic cylinder 252 may be substantially maintained such that there is no substantial fluid flow out of the second sections 262 and the fluid pressure exerted onto the pressure relief valve 288 does not adjust the position of the pressure relief valve 288. Thus, the pressure relief valve 288 remains in a position that blocks fluid flow from the second sections 262 to the fluid reservoir valves 274 and toward the fluid reservoir 270. As a result, the hydraulic cylinders 252 may be fluidly isolated from a remainder of the hydraulic system. Further still, the control system 278 may instruct the fluid reservoir valves 274 to transition to the second position to block fluid flow between the fluid reservoir 270 and the first hydraulic circuit 258. As a result, the amount of fluid within the first hydraulic circuit 258 may be substantially maintained in order to substantially maintain the hydraulic cylinders 252 and the gauge wheels at the current positions.

In certain embodiments, the first hydraulic circuit 258 may include first accumulators 290 that are fluidly coupled to the first section 260 of the hydraulic cylinders 252. The first accumulators 290 may be configured to adjust the amount of fluid in the first sections 260 even though fluid flow is blocked between the fluid reservoir 270 and the first sections 260. For example, during operation of the agricultural system, a force may be imparted onto the gauge wheels, such as by the contour of the field, an obstacle on the field, and the like. The first accumulators 290 may enable the amount of fluid in the first sections 260 to change, thereby enabling the rod 256 to move within the body 254 as caused by the force imparted onto the gauge wheels. In this manner, the first accumulators 290 may enable the gauge wheels to oscillate from the set position while the hydraulic system 250 is in the first configuration. As such, even though fluid flow is blocked between the fluid reservoir 270 and the first sections 260 in the first configuration, the first accumulators 290 may receive fluid from the first sections 260 to enable the rods 256 to move in the second direction 268 to raise the gauge wheels from the set position when sufficient force is imparted onto the gauge wheels, and the first accumulators 290 may direct fluid from the first sections 260 to the first accumulators 290 to enable the rods 256 to move in the first direction 266 to lower the gauge wheels from the set position when another sufficient force is imparted onto the gauge wheels. As an example, a bump on the field may cause the rods 256 to move in the second direction 268 from a set position to raise the gauge wheels, and the rods 256 may move in the first direction 266 to return to the set position to lower the gauge wheels after navigating across the bump. However, the first accumulators 290 may substantially maintain the amount of fluid in the first sections 260 to return the gauge wheels to the set position when there is no sufficient force imparted onto the gauge wheels. Such oscillatory motion of the gauge wheels may improve navigation of the agricultural system on the field and substantially maintain a position of the header (e.g., relative to the field).

The first hydraulic circuit 258 may also include a second accumulator 292 that is fluidly coupled to the second section 262 of the hydraulic cylinders 252. The second accumulator 292 may be configured to adjust the amount of fluid in the second sections 262 even though fluid flow is blocked between the fluid reservoir 270 and the second sections 262. For instance, fluid flow may transfer between the second sections 262 and the second accumulator 292 to accommodate movement of the rod 256 within the body (e.g., caused by forces imparted onto the gauge wheels). Therefore, the second accumulator 292 may further facilitate oscillatory or spring-like motion of the gauge wheels from the set position. As an example, as the rod 256 moves in the body 254 in the second direction 268 such that fluid flows from the first sections 260 to the first accumulators 290, fluid may flow from the second accumulator 292 into the second sections 262. Additionally, as the rod 256 moves in the body 254 in the first direction 266 such that fluid may flow from the first accumulators 290 into the first sections 260, fluid may flow from the second sections 262 to the second accumulator 292. Although the illustrated embodiment includes two first accumulators 290 and one second accumulator 292, additional or alternative embodiments may include any suitable number of first accumulators and second accumulators, such as one first accumulator and two second accumulators, or more than two first accumulators and more than two second accumulators.

The second position of the fluid reservoir valves 274 may enable fluid flow between the fluid reservoir 270 and the second hydraulic circuit 272. Thus, during the first configuration of the hydraulic system 250, fluid from the fluid reservoir 270 may be used to control other components, such as via the provision of the fluid to one or more actuators that lift and lower the reel relative to the frame, of the header. For example, the control system 278 may operate the agricultural system in a harvesting operation in which the position of the gauge wheels is substantially maintained in a set position while other components of the header may be adjusted to harvest crops. Thus, the control system 278 may operate the hydraulic system 250 in the first configuration during the harvesting operation in order to block fluid flow between the fluid reservoir 270 and the hydraulic cylinders 252.

Furthermore, the control system 278 may operate the agricultural system in an adjustment operation in which the position of the gauge wheels is adjusted toward a target position in order to adjust the position of the header relative to the ground. During the adjustment operation, the agricultural system may not be configured to harvest crops and thus, other components of the header may not be adjustable. By way of example, the control system 278 may operate the agricultural system in the adjustment operation before the harvesting operation to prepare for harvesting the crops. However, in some embodiments, the adjustment operation may be an efficient and temporary operation that is carried out during the harvesting operation (e.g., to transition between different types of harvesting operations).

Figure 4:
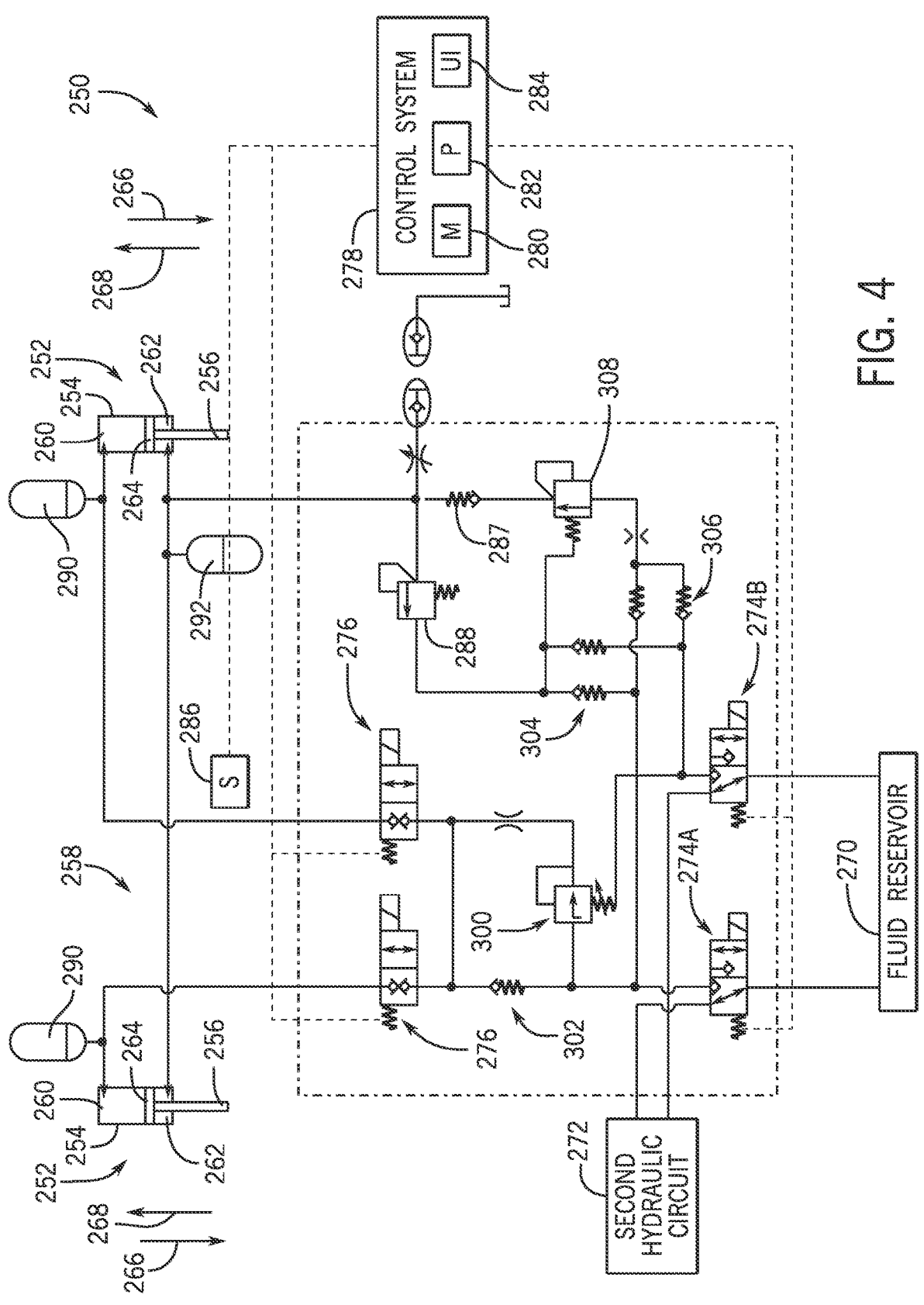
FIG. 4 is a schematic diagram of the hydraulic system of FIG. 3 in a lowering configuration, in accordance with an aspect of the present disclosure.

FIG. 4 is a schematic diagram of the hydraulic system 250 of FIG. 3 in a second or lowering configuration (e.g., of the adjustment operation of the agricultural system), which may be used to move the rods 256 in the first direction 266 to lower the gauge wheels relative to the frame (i.e., to move the gauge wheels away from the frame). In the second configuration, the control system 278 may instruct the fluid reservoir valves 274 to transition to the first position to enable fluid flow between the fluid reservoir 270 and the first hydraulic circuit 258, thereby blocking fluid flow between the fluid reservoir 270 and the second hydraulic circuit 272. Moreover, the control system 278 may instruct the gauge wheel valves 276 to transition to the third position to enable fluid flow between the fluid reservoir valves 274 and the gauge wheel valves 276. For example, fluid may be directed (e.g., via a pump) from the fluid reservoir 270 through a first fluid reservoir valve 274A, through the gauge wheel valves 276, and to the first sections 260 of the hydraulic cylinders 252 to increase the fluid pressure in the first sections 260. Therefore, the fluid pressure in the first sections 260 may be greater than the fluid pressure in the second sections 262 of the hydraulic cylinders 252. The fluid pressure differential may drive the rod 256 to move in the first direction 266 within the body 254. For example, fluid may continue to be directed into the first sections 260 until sensor data is received, via the sensor 286, to indicate that the gauge wheel is at a target lowered position.

In some embodiments, the first hydraulic circuit 258 may include a first pressure reducing valve 300 to block excessive pressure from building in the first sections 260. For example, pressure in the first sections 260 above a threshold pressure may exert a sufficient fluid pressure onto the first pressure reducing valve 300 to move the first pressure reducing valve 300 to a position that blocks fluid flow from the fluid reservoir 270 to the first sections 260. Additionally, a second check valve 302 may be disposed on the first hydraulic circuit 258 to block fluid flow from the fluid reservoir 270 to the first sections 260, thereby blocking additional fluid pressure from building in the first sections 260.

Movement of the rod 256 in the first direction 266 may drive fluid to flow out of the second section 262 of the hydraulic cylinders 252. In some embodiments, the fluid may flow out of the second sections 262 into the second accumulator 292. For example, if the second accumulator 292 is not filled beyond a threshold level (e.g., a capacity), the second accumulator 292 may continue to receive fluid directed out of the second sections 262. For instance, the second accumulator 292 may receive fluid when movement of the rod 256 in the body 254 is relatively small. In such circumstances, there may not be sufficient fluid pressure exerted onto the pressure relief valve 288 to position the pressure relief valve 288 and enable fluid flow from the second sections 262 to the fluid reservoir 270. As such, the pressure relief valve 288 may continue to block fluid flow from the second sections 262 into the fluid reservoir 270. However, if additional fluid is to be directed out of the second sections 262 (e.g., if the second accumulator 292 is filled to capacity, if movement of the rod 256 in the body 254 is relative large), sufficient fluid pressure may be exerted onto the pressure relief valve 288 (e.g., due to excess fluid flow out of the second sections 262 after the second accumulator 292 is filled to capacity) to cause the pressure relief valve 288 to adjust positions and enable fluid flow from the second sections 262 into the fluid reservoir 270. Thus, fluid may flow from the second sections 262 through the pressure relief valve 288, through third check valves 304, and through a second fluid reservoir valve 274B into the fluid reservoir 270.

In some embodiments, fourth check valves 306 and/or a second pressure reducing valve 308 may be disposed in the first hydraulic circuit 258. The fourth check valves 306 may block fluid flow through the second pressure reducing valve 308 toward the fluid reservoir 270, and the second pressure reducing valve 308 may block excessive pressure from building in the second sections 262. For example, pressure in the second sections 262 above a threshold pressure may exert a fluid pressure onto the second pressure reducing valve 308 to block fluid flow from the fluid reservoir 270 to the second sections 262, thereby blocking additional fluid flow from building in the second sections 262.

Figure 5:
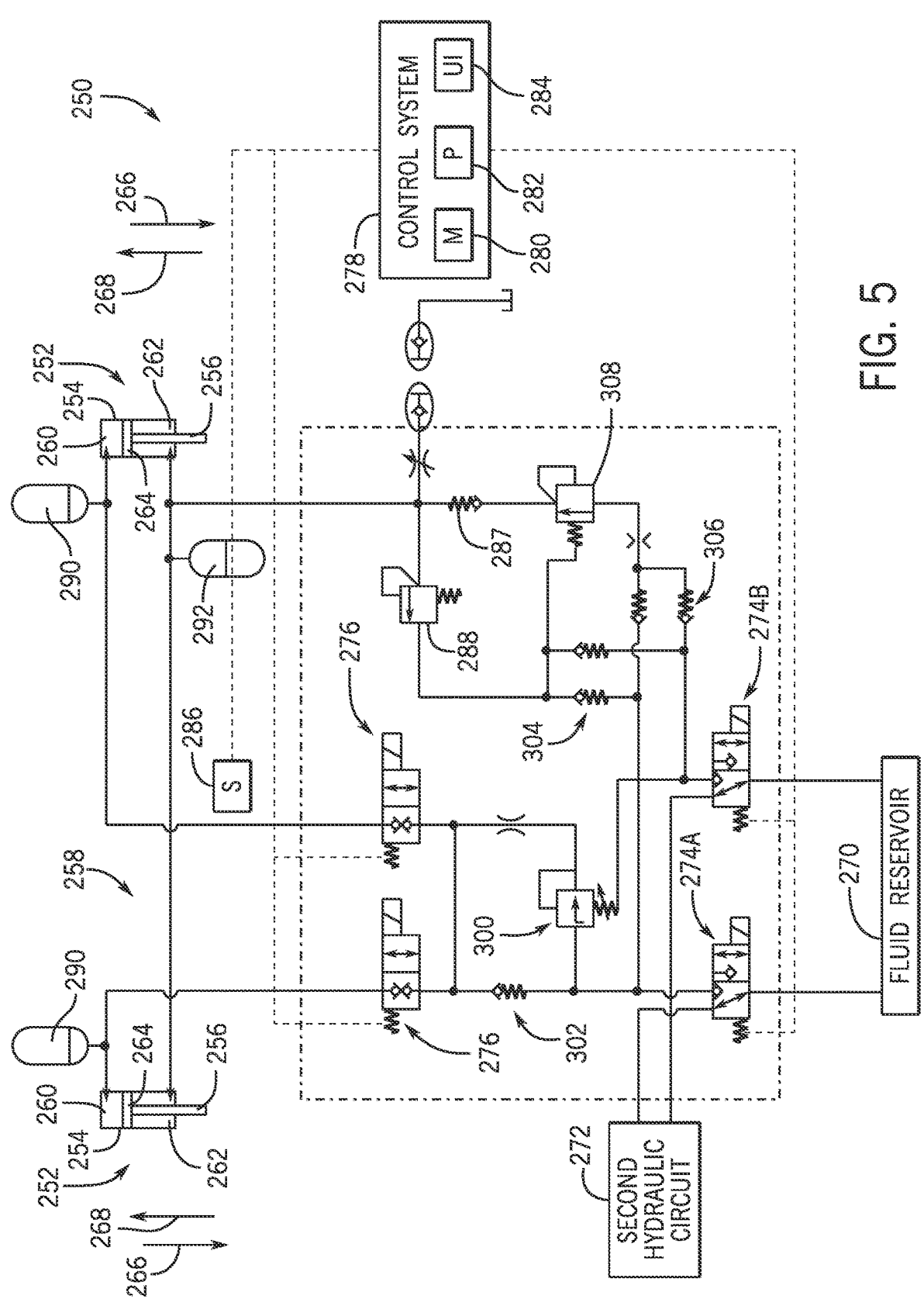
FIG. 5 is a schematic diagram of the hydraulic system of FIG. 3 in a raising configuration, in accordance with an aspect of the present disclosure.

FIG. 5 is a schematic diagram of the hydraulic system 250 of FIGS. 3 and 4 in a third or raising configuration (e.g., of the adjustment operation of the agricultural system), which may be used for moving the rod 256 in the second direction 268 to raise the gauge wheels relative to the frame (i.e., move the gauge wheels toward the frame). In the third configuration, the control system 278 may instruct the fluid reservoir valves 274 to transition to the first position to enable fluid flow between the fluid reservoir 270 and the first hydraulic circuit 258, and the control system 278 may instruct the gauge wheel valves 276 to transition to the third position to enable fluid flow between the fluid reservoir valves 274 and the gauge wheel valves 276. In order to raise the gauge wheels, the rod 256 may be driven to move in the second direction 268 in the body 254. To this end, fluid may be directed (e.g., via a pump) from the first sections 260 through the gauge wheel valves 276, through the second check valve 302, through the first fluid reservoir valve 274A, and into the fluid reservoir 270. As a result, the fluid pressure in the first section 260 may be less than the fluid pressure in the second section 262. Such fluid pressure differential may therefore drive the rod 256 to move in the second direction 268 in the body 254. For instance, fluid may continue to be directed out of the first sections 260 until sensor data is received, via the sensor 286, to indicate that the gauge wheel is at a target raised position.

Movement of the rod 256 in the second direction 268 in the body 254 may cause fluid to be directed into the second section 262. In some embodiments, fluid may be directed from the second accumulator 292 into the second sections 262 (e.g., for relatively small movement of the rod 256). In additional or alternative embodiments, fluid may be directed from the fluid reservoir 270 to the second sections 262 (e.g., for relatively large movement of the rod 256). For instance, fluid may flow from the fluid reservoir 270 through the second fluid reservoir valve 274B, through the fourth check valves 306, through the pressure maintenance valve 308, through the first check valve 287, and into the second sections 262.

As described herein, movement of the rod 256 within the body 254 may be driven based on changing the fluid pressure within the first section 260. That is, fluid may be actively directed (e.g., via a pump) from the fluid reservoir 270 into the first section 260 to increase the fluid pressure within the first section 260 (e.g., to 4137 kilopascals [kPa] or 700 pounds per square inch [psi], to 6900 kPa or 1000 psi, to 8963 kPa or 1300 psi), and fluid may be actively directed (e.g., via a pump) out of the first section 260 to reduce the fluid pressure within the first section 260 (e.g., to 2758 kPa or 400 psi, to 2068 kPa or 300 psi, to 689 kPa or 100 psi). Moreover, the fluid pressure within the second section 262 may be substantially maintained (e.g., 1379 kPa or 200 psi, at 3447 kPa or 500 psi, a t5516 kPa or 800 psi). That is, fluid is not actively directed into or removed from the second section 262 to adjust the fluid pressure within the second section 262. Rather, the amount of fluid in the second section 262 may adjust as a result of movement of the rod 256 within the body 254 as caused by the change in fluid pressure in the first section 260 (e.g., a fluid pressure differential between the first section 260 and the second section 262). However, in additional or alternative embodiments, the fluid pressure in the second section may be adjustable, such as by actively directing fluid (e.g., via a pump) from the fluid reservoir into the second section and/or by actively directing fluid (e.g., via a pump) from the second section into the fluid reservoir. In any case, the fluid reservoir 270 may be used to create a fluid pressure differential between the first section 260 and the second section 262 in order to drive the rod 256 to move within the body 254.

Figure 6:
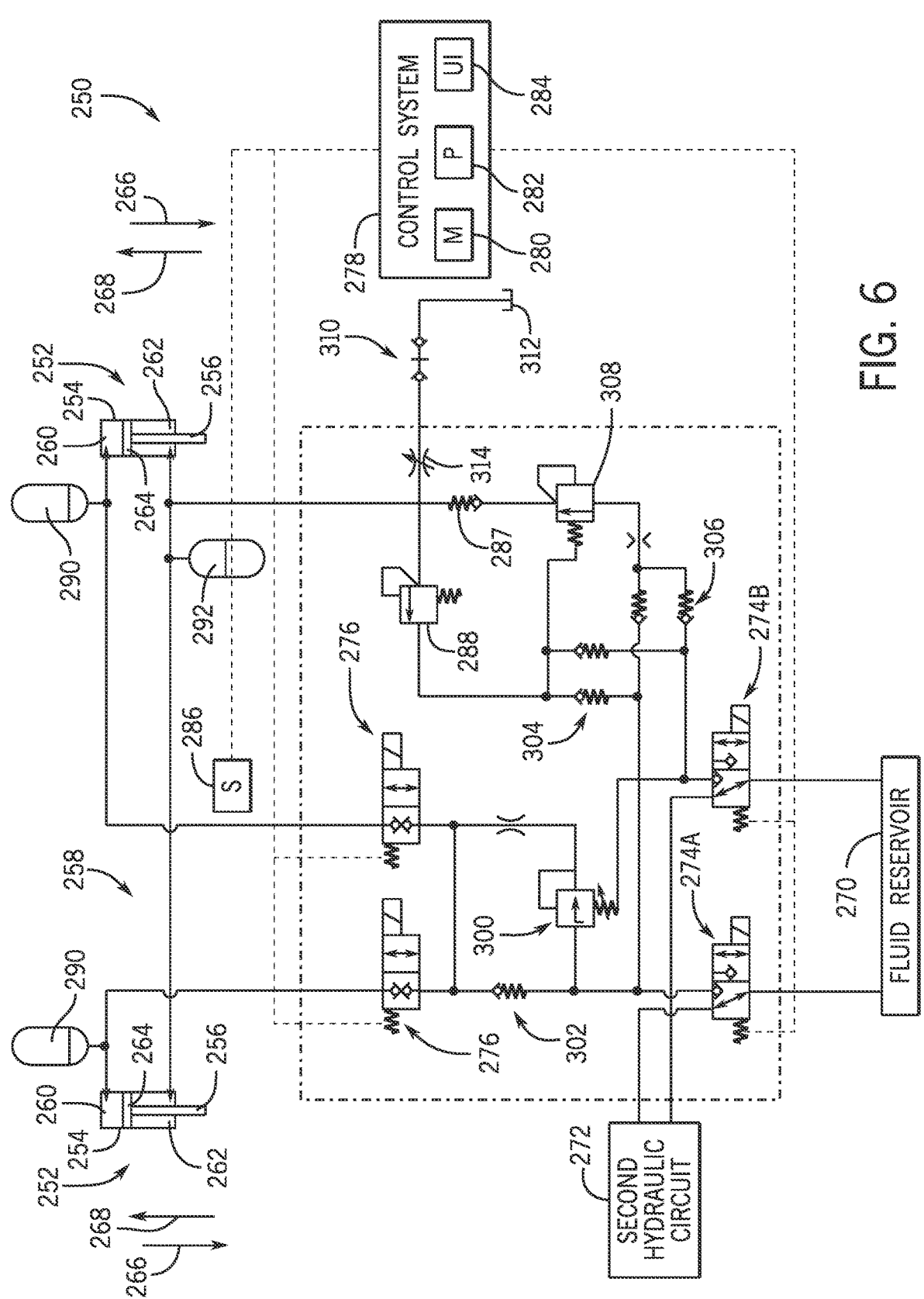
FIG. 6 is a schematic diagram of the hydraulic system of FIG. 3 in a draining configuration, in accordance with an aspect of the present disclosure.

FIG. 6 is a schematic diagram of the hydraulic system 250 of FIGS. 3-5 in a fourth or draining configuration, which may be used to drain fluid from the first hydraulic circuit 258. By way of example, the fourth configuration may be used to prepare the hydraulic system 250 for maintenance, in which various parts of the hydraulic system 250, such as the hydraulic cylinders 252, may be inspected by a user. In the fourth configuration, the control system 278 may instruct the gauge wheel valves 276 to transition to the third position to enable fluid flow between the fluid reservoir valves 274 and the gauge wheel valves 276, and the control system 278 may instruct the fluid reservoir valves 274 to transition to the first position to enable fluid flow between the fluid reservoir 270 and the first hydraulic circuit 258. Thus, fluid may be directed from the first section 260 through the gauge wheel valves 276 and through the first fluid reservoir valve 274A into the fluid reservoir 270 so as to remove fluid from the first sections 260. In addition, the pressure relief valve 288 may be positioned to block fluid flow from the fluid reservoir 270 into the second sections 262 as a result of reduced fluid pressure in the first sections 260 due to removal of fluid from the first sections 260.

The first hydraulic circuit 258 may also include a service line 310 that may fluidly couple the second sections 262 to a service system, which may include a service fluid reservoir 312. The service line 310 may include a service valve 314 that may be engaged or activated in the fourth configuration to enable fluid to flow from the second sections 262 through the service line 310 and into the service fluid reservoir 312. In certain embodiments, the service valve 314 may be manually actuated, such as by a user of the agricultural system. In additional or alternative embodiments, the service valve may be actuated by the control system, such as from a user input via the user interface. In any case, fluid may be directed from the first sections 260 to the fluid reservoir 270 to remove fluid from the first hydraulic circuit 258, and fluid may be directed from the second sections 262 to the service line 310 to remove a remaining amount of fluid from the first hydraulic circuit 258. Thus, there may not be a substantial amount of fluid remaining in the first hydraulic circuit 258 after draining the fluid in the fourth configuration, and maintenance may be performed on the hydraulic system 250 accordingly. In further embodiments, the service system may be used to supply additional fluid into the first hydraulic circuit. That is, for example, the service valve may be engaged or activated and fluid may be supplied from the service fluid reservoir into the first hydraulic circuit (e.g., manually by the user and/or automatically by the control system), such as to maintain a fluid pressure within the first hydraulic circuit. As such, the service line may be used for increasing or reducing the amount of fluid within the first hydraulic circuit.

In certain embodiments, the user interface 284 of the control system 278 may be used to adjust between the various configurations of the hydraulic system 250. As an example, the user may utilize the user interface 284 to request the agricultural system to operate in the harvesting operation, and the control system 278 may therefore output a control signal (e.g., to the fluid reservoir valves 274 and/or to the gauge wheel valves 276) to operate the hydraulic system 250 in the first configuration and substantially maintain the position of the gauge wheels. The user may also utilize the user interface 284 to request the agricultural system to operate in the adjustment operation, such as to lower or to raise the gauge wheels. Based on such user input, the control system 278 may output a control signal to set the position of the fluid reservoir valves 274 and/or of the gauge wheel valves 276 accordingly, and the control system 278 may direct fluid from the fluid reservoir 270 to the first sections 260 (e.g., to lower the gauge wheels) and/or to direct fluid from the first sections 260 to the fluid reservoir 270 (e.g., to raise the gauge wheels). In an example, the user may utilize the user interface 284 to indicate a target position of the gauge wheels, and the control system 278 may operate the hydraulic system 250 in the second configuration or in the third configuration based on the target position relative to a current position of the gauge wheels. In another example, the user may utilize the user interface 284 to directly indicate a request to raise or lower the gauge wheels without indicating a target position, and the control system 278 may operate the hydraulic system 250 accordingly.

Figure 7:
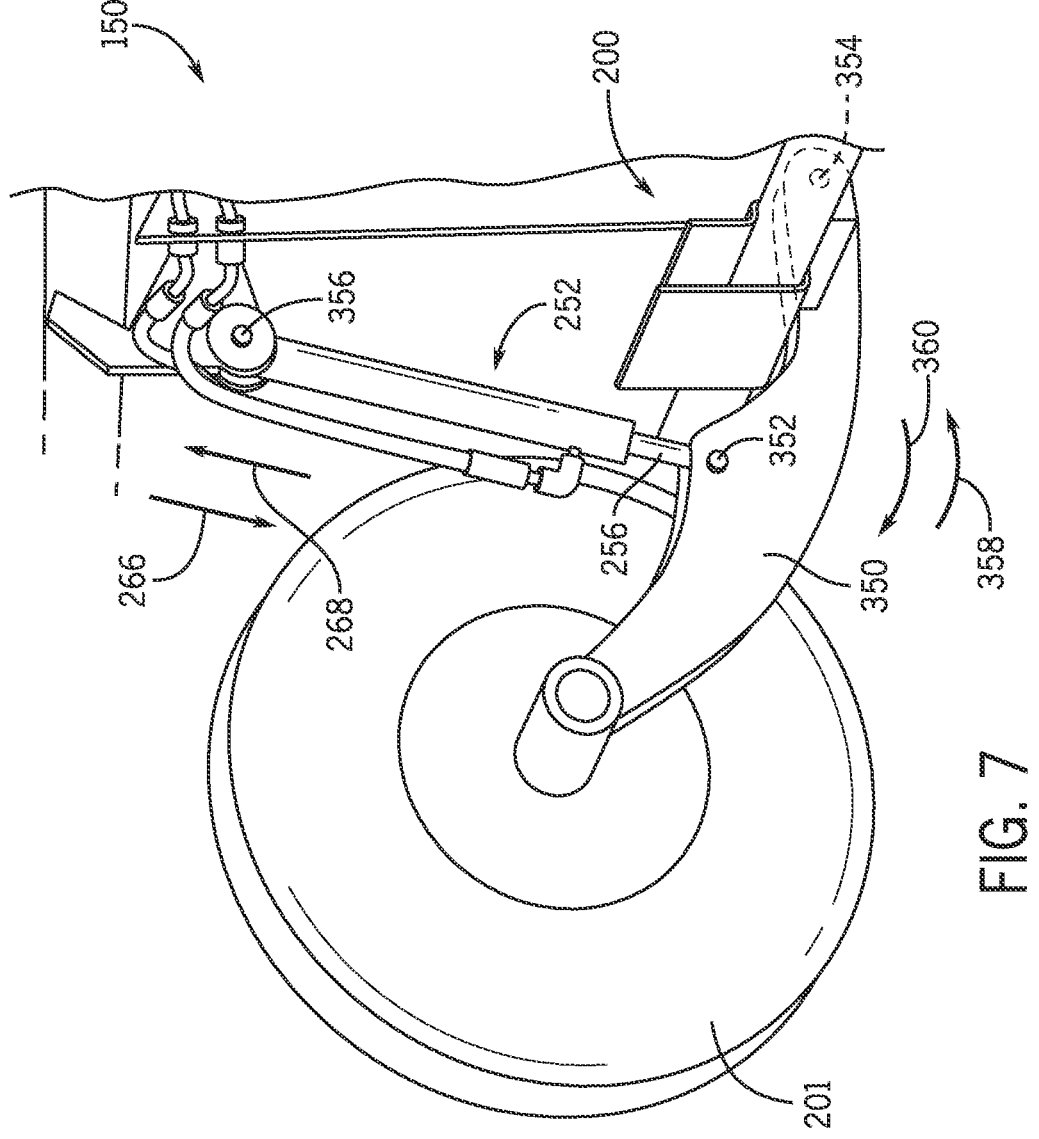
FIG. 7 is a rear perspective view of a portion of the header of FIG. 2 that may employ the hydraulic system of FIG. 3, in accordance with an aspect of the present disclosure.

FIG. 7 is a rear perspective view of a portion of the header 150 of FIG. 2 that may employ the hydraulic system 250 of FIG. 3. In the illustrated embodiment, a bracket 350 that is coupled to the gauge wheel 201 is connected to the rod 256 of the hydraulic cylinder 252 at a first pivot 352. The bracket 350 is also coupled to the frame 200 at a second pivot 354, and the hydraulic cylinder 252 is coupled to the frame 200 at a third pivot 356. The connection between the frame 200, the gauge wheel 201, the hydraulic cylinder 252, and the bracket 350 may enable movement of the gauge wheel 201 relative to the frame 200 of the header 150. For example, movement of the rod 256 in the first direction 266 may drive rotation of the bracket 350 relative to the hydraulic cylinder 252, rotation of the bracket 350 relative to the frame 200, and/or rotation of the hydraulic cylinder 252 relative to the frame 200 in a first rotational direction 358 via the first pivot 352, the second pivot 354, and/or the third pivot 356, respectively, to drive the gauge wheel 201 away from the frame 200 (e.g., to raise the frame 200 relative to the field). Further, movement of the rod 256 in the second direction

268 may drive rotation of the bracket 350 relative to the hydraulic cylinder 252, rotation of the bracket 350 relative to the frame 200, and/or rotation of the hydraulic cylinder 252 relative to the frame 200 in a second rotational direction 360 via the first pivot 352, the second pivot 354, and/or the third pivot 356, respectively, to drive the gauge wheel 201 toward the frame 200 (e.g., to lower the frame 200 relative to the field). During a harvest mode in which the hydraulic cylinder 252 is fluidly isolated from the fluid reservoir, the position of the rod 256 may be substantially maintained to limit or block movement of the frame 200, the gauge wheel 201, the hydraulic cylinder 252, and/or the bracket 300 relative to one another. Indeed, the techniques described with respect to FIGS. 3-6 to drive movement of the hydraulic cylinder 252 may be applied in the illustrated embodiment to drive movement of the gauge wheel 201 relative to the frame 200.

While only certain features of the disclosure have been illustrated and described herein, many modifications and changes will occur to those skilled in the art. For example, any of the illustrated components may not be included and/or may be modified, and/or other components may be added to the embodiments disclosed herein. For instance, an additional or alternative embodiment may not include the second hydraulic circuit 272 and/or the fluid reservoir valves 274. It is, therefore, to be understood that the appended claims are intended to cover all such modifications and changes as fall within the true spirit of the disclosure. It should be noted that numerical terms (e.g., first, second, third, fourth) are merely used to facilitate discussion of separate components and are not intended to be limiting.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C.

The invention claimed is:

1. An agricultural system, comprising:
   a header comprising a gauge wheel and a frame, wherein the gauge wheel and the frame are coupled to a hydraulic cylinder that is configured to adjust the gauge wheel relative to the frame;
   a first hydraulic circuit fluidly coupled to the hydraulic cylinder, wherein the first hydraulic circuit is configured to control a fluid flow into and out of the hydraulic cylinder to adjust the gauge wheel relative to the frame, and the first hydraulic circuit comprises an accumulator configured to enable an amount of fluid in the hydraulic cylinder to change during a harvesting operation of the agricultural system such that the gauge wheel may oscillate from a set position during the harvesting operation; and
   a second hydraulic circuit, a fluid reservoir, and a valve, wherein the valve is configured to selectively enable the fluid to flow between the fluid reservoir and the first hydraulic circuit while the valve is in a first position and between the fluid reservoir and the second hydraulic circuit while the valve is in a second position.

2. The agricultural system of claim 1, wherein the first hydraulic circuit comprises a second valve configured to enable the fluid to flow into and out of the first hydraulic circuit during an adjustment operation of the agricultural system to adjust the gauge wheel relative to the frame.

3. The agricultural system of claim 1, wherein the second hydraulic circuit is configured to control a reel lift of the header.

4. The agricultural system of claim 1, wherein the valve is configured to block the fluid from flowing between the fluid reservoir and the first hydraulic circuit in the harvesting operation of the agricultural system.

5. The agricultural system of claim 1, wherein the first hydraulic circuit is configured to direct the fluid from the hydraulic cylinder to the fluid reservoir to cause the gauge wheel to move toward the frame, and the first hydraulic circuit is configured to direct the fluid from the fluid reservoir into the hydraulic cylinder to cause the gauge wheel to move away from the frame.

6. The agricultural system of claim 1, wherein the hydraulic cylinder comprises a first section and a second section, and the first hydraulic circuit is configured to direct the fluid to flow between the fluid reservoir and the first section, between the fluid reservoir and the second section, or both, to adjust the gauge wheel relative to the frame.

7. A hydraulic system for an agricultural system, the hydraulic system comprising:
   a hydraulic cylinder comprising a rod coupled to a gauge wheel of the agricultural system, wherein the hydraulic cylinder comprises a first section and a second section;
   a fluid reservoir;
   a valve configured to transition between a first position and a second position, wherein the valve is configured to enable a fluid to flow between the fluid reservoir and the first section of the hydraulic cylinder while the valve is in the first position to adjust a position of the rod, and the valve is configured to block the fluid from flowing between the fluid reservoir and the first section of the hydraulic cylinder while the valve is in the second position;
   a first accumulator configured to receive the fluid from or supply the fluid to the first section of the hydraulic cylinder regardless of the position of the valve; and
   a second accumulator configured to receive the fluid from or supply the fluid to the second section of the hydraulic cylinder regardless of the position of the valve.

8. The hydraulic system of claim 7, wherein the fluid flowing from the fluid reservoir to the first section is configured to increase the respective fluid pressure in the first section to drive movement of the rod in a first direction, and the fluid flowing from the first section to the fluid reservoir is configured to reduce the respective fluid pressure in the first section to drive movement of the rod in a second direction opposite the first direction.

9. The hydraulic system of claim 7, wherein the first accumulator is configured to receive the fluid from or supply the fluid to the first section of the hydraulic cylinder while the valve is in the second position, the second accumulator is configured to receive the fluid from or supply the fluid to the second section of the hydraulic cylinder while the valve is in the second position, or both, to facilitate oscillatory motion of the gauge wheel while the valve is in the second position.

10. The hydraulic system of claim 7, comprising a service line configured to direct the fluid from the second section to a service system of the agricultural system.

11. The hydraulic system of claim 7, wherein the valve is a first valve, the hydraulic system comprises a second valve configured to transition between a third position and a fourth position, the third position of the second valve enables the fluid to flow between the first valve and the first section of the hydraulic cylinder, and the fourth position of the second valve blocks the fluid from flowing between the first valve and the first section of the hydraulic cylinder.

12. The hydraulic system of claim 11, wherein the hydraulic system comprises a control system communicatively coupled to the first valve and the second valve, wherein the control system is configured to instruct the first valve to transition to the second position and instruct the second valve to transition to the fourth position to substantially maintain a position of the rod, and the control system is configured to instruct the first valve to transition to the first position and to instruct the second valve to transition the third position to adjust the position of the rod.

13. The hydraulic system of claim 12, wherein the control system is configured to instruct the first valve to transition to the second position in a harvest mode of the agricultural system to fluidly isolate the hydraulic cylinder from the fluid reservoir.

14. An agricultural system, comprising:
a header comprising a gauge wheel and a frame; and
a hydraulic system, comprising:
  a hydraulic cylinder coupled to the gauge wheel and to the frame;
  a fluid reservoir;
  a first hydraulic circuit fluidly coupling the fluid reservoir with the hydraulic cylinder; and
  a second hydraulic circuit fluidly coupling the fluid reservoir with another component of the agricultural system;
  a valve configured to selectively enable fluid to flow between the fluid reservoir and the first hydraulic circuit while the valve is in a first position and between the fluid reservoir and the second hydraulic circuit while the valve is in a second position; and
a control system communicatively coupled to the valve, the control system is configured to instruct the valve to transition to the first position to transition the hydraulic system to a first configuration, the control system is configured to instruct the valve to transition to the second position to transition the hydraulic system to a second configuration, the hydraulic system is configured to enable the fluid to flow between the fluid reservoir and the first hydraulic circuit while the hydraulic system is in the first configuration to change a respective position of the gauge wheel relative to the frame, and the hydraulic system is configured to enable the fluid to flow between the fluid reservoir and the second hydraulic circuit in the second configuration to change a respective position of the other component.

15. The agricultural system of claim 14, comprising an accumulator fluidly coupled to the hydraulic cylinder, wherein the accumulator is configured to enable an amount of the fluid to flow into and out of the hydraulic cylinder such that the gauge wheel may oscillate during the first configuration of the hydraulic system.

16. The agricultural system of claim 14, wherein the hydraulic system is configured to block the fluid from flowing between the fluid reservoir and the first hydraulic circuit in the second configuration, and the hydraulic system is configured to block the fluid from flowing between the fluid reservoir and the second hydraulic circuit in the first configuration.

17. The agricultural system of claim 1, wherein the second hydraulic circuit is configured to control a reel lift of the header.

* * * * *